Jan. 7, 1936.                    C. R. DOWNS                    2,026,935
                 METHOD AND APPARATUS FOR CONDITIONING AIR
                   Filed Aug. 17, 1932          5 Sheets-Sheet 1

INVENTOR
CHARLES R. DOWNS
BY
his ATTORNEYS

Jan. 7, 1936.                C. R. DOWNS                2,026,935
           METHOD AND APPARATUS FOR CONDITIONING AIR
                    Filed Aug. 17, 1932        5 Sheets-Sheet 3

INVENTOR
CHARLES R. DOWNS
BY
          ATTORNEYS

Jan. 7, 1936. C. R. DOWNS 2,026,935
METHOD AND APPARATUS FOR CONDITIONING AIR
Filed Aug. 17, 1932 5 Sheets-Sheet 4

INVENTOR
CHARLES R. DOWNS
BY
his ATTORNEYS

Jan. 7, 1936.  C. R. DOWNS  2,026,935
METHOD AND APPARATUS FOR CONDITIONING AIR
Filed Aug. 17, 1932  5 Sheets-Sheet 5

INVENTOR
CHARLES R. DOWNS
BY
*His* ATTORNEYS

Patented Jan. 7, 1936

2,026,935

UNITED STATES PATENT OFFICE 2,026,935

METHOD AND APPARATUS FOR CONDITIONING AIR

Charles R. Downs, Old Greenwich, Conn., assignor to Weiss and Downs, Inc., New York, N. Y., a corporation of New York Application August 17, 1932, Serial No. 629,121

13 Claims. (Cl. 183—4)

This invention relates to improvements in the conditioning of air in enclosed spaces, especially those used by mankind as living or working quarters. The object of the invention is to provide an improved method and improved apparatus for conditioning air so as to make air conditioning available for all purposes at a moderate first cost and moderate cost of operation. By means of my present invention the air in dwelling houses, living apartments, factories, offices, restaurants, stores, storage rooms and the like is conditioned to make them more comfortable as well as to produce a suitable moisture content of the air contained therein. More especially the invention is concerned with the provision of an improved method and apparatus for dehumidifying or removing moisture from air in summer, with little or no change in temperature, and humidifying or adding moisture to air in winter. The invention also includes the provision of dehumidifying or drying material in a novel and improved form as an article of manufacture.

It has heretofore been proposed to remove moisture from the air in enclosed spaces by refrigeration, by absorption with non-deliquescent absorbent material, such, for example, as silica gel, and by absorption with a deliquescent material such as calcium chloride. Of these three methods, the dehumidification with a deliquescent material, particularly calcium chloride, has been found to be the most economical.

As concerns the removal of moisture from air by absorption with a deliquescent material such as calcium chloride, the processes and apparatus heretofore used for this purpose have been unsuitable for the dehumidification of living or working quarters, and the present invention aims to overcome the difficulties heretofore experienced in drying air by means of deliquescent material, and to adapt this method of treating air to the dehumidification of living or working quarters and similar enclosed spaces.

When a solid deliquescent material absorbs water and a portion thereof is dissolved, a saturated solution is formed. This concentrated solution as it drains from the solid also possesses the property of absorbing still more moisture from sufficiently moist air. My invention includes the collection of this solution in a plurality of layers or pools over which the air to be dehumidified is circulated, the solution passing from one pool to the next and becoming more and more dilute through the absorption of additional water from the air, and finally being discharged to waste. The air after being partially dried by circulating over these layers or pools is then passed into contact with solid deliquescent material.

My invention further provides for holding the solution in contact with the air for partially pre-drying it long enough to establish substantial equilibrium with the moisture in the air, then contacting the partially dried air with the solid absorbent, liquefying a portion of the same and automatically supplying the solution to the pre-drying step by the liquefaction of the deliquescent solid material in an amount and at a rate proportional to the moisture absorbed by the solid absorbent. In this way the rate of solution feed for varying moisture contents of the air undergoing treatment is automatically adjusted.

In all processes and apparatus heretofore proposed of which I am aware, wherein a deliquescent material such as calcium chloride has been employed as a drying agent, it has been proposed to utilize calcium chloride in granulated form and to pass the air to be dried, or a portion thereof, through beds of such granular material. Anhydrous granular calcium chloride has most often been suggested for this purpose. The characteristics of anhydrous calcium chloride, however, are such that the operation of apparatus of this sort for any length of time will cause it, upon the absorption of water from the air, to be changed into hydrous calcium chlorides containing one or more molecules of water. All of these hydrous chlorides are solid at ordinary temperatures. The hydrated calcium chlorides which are formed expand and effectively fill the interstices between the original granules and stop the flow of the air through the mass.

More recently calcium chloride granules or flakes containing water of crystallization have been placed on the market. These granules are made on a chip machine and possess in general a plate-like structure, varying considerably in shape and size. They are moreover not structurally strong and during preparation and shipment fine sizes are produced causing a variable condition of void dimensions between the granules. When an attempt is made to pass moist air through a mass of these granules, the pressure required is too great to be economical, firstly because of the small size of the voids and secondly because the finest particles rapidly absorb moisture to form a thick syrupy solution which flows into the spaces between the particles thereby restricting the size of the inter-particle voids.

When a mass of such material, therefore, is subjected to a current of moist air, its outer surface becomes moistened and largely impervious to air penetration. The effective drying surface is quickly limited to the outside surface of the mass which is only a small fraction of the total surface of the granules. Furthermore, the inside granules which are not absorbing moisture from the air act as a spongy mass into which the calcium chloride solution diffuses. Hence, as long as the voids in the mass are not filled only a part of the calcium chloride solution formed in the process drains away from the mass of solid calcium chloride for use in predrying the air before contacting with the mass of solid. This effect interferes with the automatic supplying of the solution to the predrying step by the liquefaction of the calcium chloride in an amount and at a rate proportional to the moisture absorbed by the solid calcium chloride.

To overcome this difficulty, I propose to utilize deliquescent material such as solid calcium chloride in massive form whereby a quantity, charge or bed of the material contains passages which will remain open during the absorption of moisture to permit ample air movement therethrough at low resistances and also to permit rapid drainage of calcium chloride solution out of the voids in the mass. The massive material may be employed in the form of slabs or cakes, lumps, briquets, fragments and the like. They may be molded or cast or produced by mechanically compressing the solid into forms or dies or they may be made by breaking up and screening larger masses of the material.

I have found that the amount of calcium chloride surface required for dehydration of air is surprisingly small provided that it is kept free for the air to contact therewith. When large cakes are used I prefer to provide the molds with corrugations or protuberances so that the contact surfaces of the cakes are in part spaced from each other. Solid cakes, however, when cast with a rough upper surface perform quite satisfactorily without especially providing for deep corrugations. Cakes in this form permit charging about twice as much weight into a drying chamber as can be obtained with granular calcium chloride. This increase in weight permits replenishment of calcium chloride about one half as often as otherwise or, vice versa, diminishes the size of the apparatus.

The water or moisture is present in the air to be dried in the form of vapor. When this vapor comes into contact with an absorbing agent it is liquefied or condensed and the latent heat of condensation is given up. This raises the temperature of both the absorbing agent and the air. Solid absorbents such as silica gel operate efficiently over relatively wide temperature ranges so that considerable temperature rises of such absorbents do not substantially affect their ability to absorb moisture. Hence, under ordinary conditions of use it is not essential to cool such absorbents and cooling is therefore applied only to the air after drying to reduce its temperature to a point where it will not heat up the housed space. Such a principle is not applicable to deliquescent solid absorbents such as calcium chloride since these materials possess water vapor pressures which increase with the temperature. A rise in temperature of the absorbent therefore reduces its moisture-absorbing capacity so that the air leaving contact with the absorbent carries proportionately more moisture. Accordingly, my invention includes the cooling of the massive solid deliquescent material to remove the latent heat of condensation of the moisture in the air.

Heat removal to control the temperature of a solid deliquescent absorbent such as calcium chloride constitutes a serious practical difficulty in the use of such agents for dehumidification of air, especially when the amount of water to be condensed per unit of time is large. In overcoming this difficulty the present invention contemplates treating the air by alternate cooling and contacting with the moisture-absorbing agent, thereby utilizing the specific heat of the cooled air to prevent an objectionable rise in temperature of the absorbing agent. This cooling may be effected by transferring the heat contained in the air to a cooling means containing cold gases, vapors or liquids and if the amount of moisture to be absorbed is large the process is preferably carried out in at least two cooling zones followed consecutively by two moisture absorption zones. A large volume of air may thus be dried in a small apparatus and delivered for use at a predetermined temperature and humidity, which temperature, if desired, may be above, below or at the same temperature as before treatment. Although I have obtained excellent results in practice without cooling the air before it contacts with the solution, this may be done if desired and has the effect of lowering the temperature of the solution and thereby increasing its moisture-absorption capacity.

In apparatus as heretofore constructed for the drying of air by means of a moisture-absorbing agent, the removal of dust and other foreign matter from air has been a considerable problem. It has been necessary to provide expensive additional equipment such as filters for this purpose. The present invention, however, aims to do away with such additional equipment and to provide for the continuous effective removal of such foreign matter from the air in the drying operation itself. The masses of calcium chloride while absorbing moisture are coated with a saturated solution which is highly viscous. This solution while progressively moving to the point where it is discharged to waste becomes less and less viscous in the predrying step of the process. The dust laden air first contacts with the least viscous solution where a part of the dust is taken out and finally with the most viscous part of the liquid which acts efficiently in removing fine dust particles. The course of the air, as will be shown later, in passing through the apparatus provides an efficient means for causing the dust particles to impinge upon the calcium chloride solutions of progressively increasing viscosity, thereby removing them from suspension in the air.

Additional features of my invention will be apparent from a consideration of the accompanying drawings, in which several forms of embodiment of apparatus for carrying out the invention are illustrated, and from a consideration of the following detailed description of the invention in connection with these drawings. It will be understood, however, that the scope of my invention is not limited to the specific forms of apparatus herein illustrated but as defined in the appended claims.

In these drawings

Figure 1:
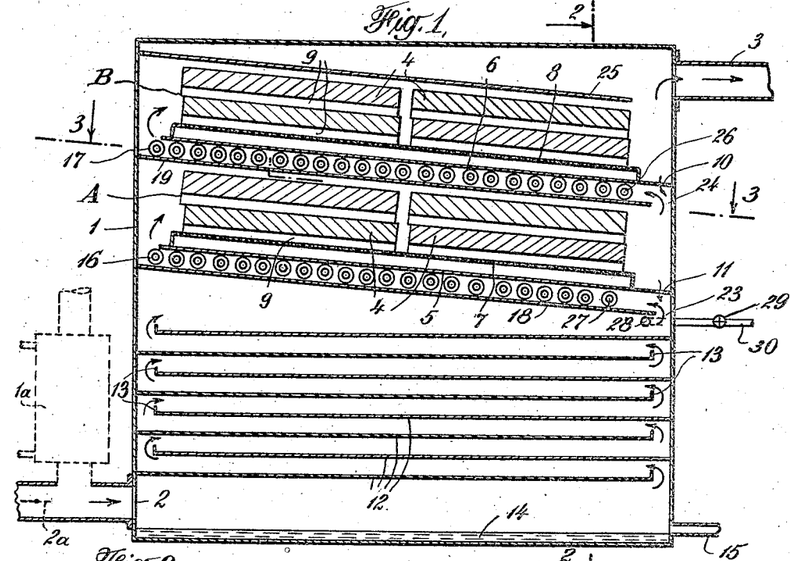
Fig. 1 is a vertical longitudinal section of one form of the air conditioning apparatus of my invention.
Figure 2:
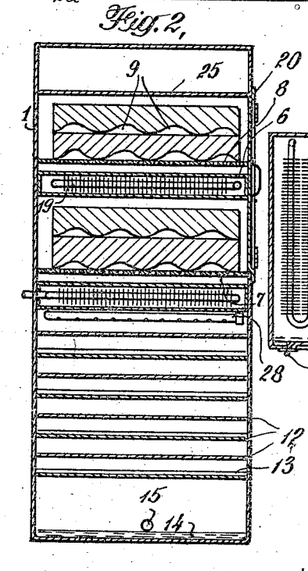
Fig. 2 is a transverse vertical section taken on line 2—2 of Fig. 1.
Figure 3:
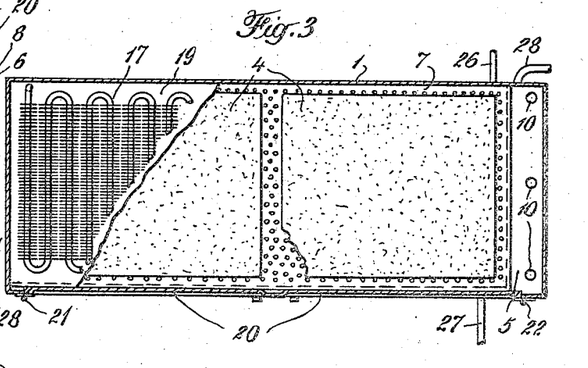
Fig. 3 is an approximately horizontal section taken on the broken line 3—3 of Fig. 1.

Referring now to the accompanying drawings, and first to Figs. 1 to 3, inclusive, the form of air conditioning apparatus here shown comprises a rectangular chamber 1 of sheet metal having an air inlet 2 at the bottom and an air outlet 3 arranged at the right-hand end near the top. Calcium chloride in the form of solid cakes 4 is placed in the upper part of this chamber. These cakes of solid calcium chloride are divided into two groups or sections A and B. The cakes are carried upon sloping shelves 5 and 6 which consist of sheet metal plates suitably supported on the walls of the chamber 1. These shelves extend into contact with the right-hand end walls of chamber 1, but the left-hand ends are spaced from the left-hand walls of the chamber to permit the passage of air. The cakes 4 of calcium chloride are supported upon perforated plates or grids 7 and 8 which rest upon the shelves 5 and 6, respectively, and are provided with feet so as to support the cakes in spaced relation to the shelves and allow the air to circulate in contact with the bottoms of the cakes as well as with their tops and sides.

The pitch or slope of shelves 5 and 6 while not enough to cause the cakes to slide, is preferably sufficient to cause the liquid calcium chloride which forms on the surface of the cakes during deliquescence to drain away from all surfaces of the cakes, thus avoiding the formation of pools of liquid on the tops of the cakes. As a means of increasing the exposed surface area of the cakes, the bottoms of the cakes are shown as corrugated in Figs. 2 and 1, thereby providing longitudinal air passages 9 between the cakes when they are stacked one upon another, and exposing the larger part of the lower surfaces of the upper cakes as well as the upper surfaces of the lower cakes to contact with the air. The liquid calcium chloride collects at the right-hand ends of shelves 5 and 6. That collecting on shelf 6 drains through small apertures 10 onto shelf 5, and thence together with the liquid on this shelf through apertures 11 in shelf 5 into the lower part of chamber 1.

In this lower portion of chamber 1 there are arranged a plurality of liquid-containing trays 12. These trays extend the full width of chamber 1 but in length they are somewhat shorter and are placed in staggered arrangement as shown in Fig. 1 so that the air will be caused to flow in a serpentine path from end to end of the chamber as indicated by the arrows. The trays 12 are welded or otherwise secured to the walls of the chamber in such a way as to form liquid-tight joints, and the free ends of the trays are provided with lips 13 so that a shallow pool of liquid collects on each tray. The liquid which drains through apertures 11 is received upon the uppermost tray 12 and overflows the lips 13 descending from tray to tray. The liquid from the lowermost tray collects in a shallow body of liquid 14 on the bottom of the chamber. The liquid leaves the chamber through pipe 15 and is discharged to waste.

Two sets 16 and 17 of cooling coils are provided, one between the series of trays 12 and the lowermost section A of calcium chloride cakes, and the other between the two cakes sections A and B. These cooling coils may be made in any convenient manner, and as shown they each consist of a metal tube provided with fins in order to increase its radiating surface and bent into serpentine form as shown in Fig. 3, thereby providing a plurality of passes back and forth across the width of chamber 1.

In order to direct the air over these cooling coils, a sheet metal plate 18 is placed beneath coil 16 and a plate 19 beneath coil 17. These plates extend the full width of chamber 1 but the right-hand ends of both plates are spaced from the end wall of the chamber so as to allow the air to pass into contact with the cooling coils. The air is guided into contact with the coil 16 by the plate 18 and the lower surface of shelf 5 which are spaced apart just slightly more than the diameter of the fins on the coils so as to bring the air into intimate contact with the cooling surfaces. The air passing over coil 17 is similarly directed by plate 19 and the lower surface of shelf 6.

As many be seen from Figs. 2 and 3, one side of chamber 1 is provided with a pair of doors 20 hinged at 21 and 22 respectively through which fresh cakes 4 of calcium chloride may be placed upon shelves 5 and 6 when necessary. These cakes are preferably made of a convenient size, shape and weight so that they may be handled without difficulty. Thus, for example, the cakes can be made in such a size that, if desired, they may be handled with a pair of ice tongs and placed in the dehumidifying chamber 1 in much the same manner as ice is placed in a refrigerator.

When the apparatus just described is placed in operation it is connected with a suitable duct system, as will be hereafter described, and the air to be treated is forced in through the inlet 2 by means of a suitable fan. Assuming that the apparatus has been in operation a sufficient length of time for the solution of the deliquescent solid to fill the trays 12 and the bottom of chamber 1, the drying of the air commences by its contact with the surface of pool 14 of the most dilute liquid. As the air rises through the series of trays 12, it comes in contact with liquid having greater and greater moisture-absorbing power.

By the time the air reaches the entrance 23 before the cooling coil 16 a large percentage of the moisture in the air has been absorbed and removed by the liquid moisture-absorbing material on the trays 12. The relative humidity of the air has hence been lowered to a considerable extent, but the temperature of the air has been raised by the liberation of the latent heat of condensation of moisture which was contained in the air. During its contact with the cooling coil 16, sufficient heat is removed from the air to reduce its temperature to about the temperature of the air entering inlet 2, and, if desired, to somewhat below this temperature.

After leaving coil 16 the air now passes around and through the mass of cakes of solid calcium chloride constituting group or section A, whereby a further considerable amount of moisture is removed from the air, accompanied again by an increase in temperature. The air in this condition now reaches entrance 24 before cooling coil 17 and in passing over this coil more heat is removed and the temperature of the air is reduced. In its final passage over the group or section B of solid calcium chloride, the relative humidity is reduced to the desired value. In order to confine the air closely to the cakes 4 of group B, a baffle plate 25 is provided, and the air is delivered around the end of this baffle plate to exit 3.

The cooling coils 17 and 16 are connected to a suitable source of water supply and these coils may be connected either in series or in parallel. Preferably, however, they are connected in series, and the incoming cold water enters the right-hand end 26 of coil 17. The two left-hand ends of the coils 17 and 16 are joined together, and the water leaving the right-hand end of coil 16 at 27 is carried to waste, or used for any purpose available. By connecting the cooling coils in this way, the coldest water passes through the coil which is in heat-exchanging relation with the air from which the greatest amount of moisture has been removed, and the warm water is brought into heat-exchanging relation with air that contains a larger amount of moisture thereby providing countercurrent flow. Cooling fluids of different temperatures and different compositions may be passed through coils 16 and 17. The lower the temperature to which the air is cooled before contacting with the cakes in A and B, the lower will be the temperature and the absolute humidity of the air discharged from the apparatus.

When it is desired to use the apparatus for the reverse operation of humidifying, that is, for the adding of moisture to the air in the winter time, for example, the cakes of calcium chloride are removed from the apparatus by hand or by complete liquefaction, and water is admitted to the trays 12 by means of a perforated pipe 28 which is connected through a valve 29 with a supply pipe 30. Water is first admitted in this way in sufficient quantity to wash the calcium chloride solution from the trays 12 and afterwards the flow is reduced to only that necessary to maintain a flow of water over the trays. The supply of water to the coils 16 and 17 is, of course, cut off. The air in passing over the trays 12 absorbs water, thereby raising its relative humidity. Warm or hot water may be supplied to trays 12 in order to control the rate of moisture absorption.

Although the apparatus has been shown with two banks of cakes and preceding coils, additional coils and cake banks can be added or more cakes used per bank, if desired.

By passing the air through the apparatus in countercurrent flow to the moisture-absorbing capacity of the solution of the deliquescent material on the trays 12, a high relative humidity head is maintained in the lower section of chamber 1. The action of the coils 16 and 17 on the air passing in contact therewith cools the same and reduces the temperature of the cake 4 of solid deliquescent material so as to produce high relative humidity heads especially at the leading edges of the cakes.

The temperature of the solution of deliquescent material in the trays 12 is held down by convection, a large portion of this heat being carried forward by the air and removed by coil 16. A portion of the heat developed in trays 12 is also removed by radiation through the walls of the apparatus when this is not covered by heat insulation and a portion is carried away in the liquid to the discharge 15.

In the construction shown in Figs. 1 and 2, the lower tray section may be made separate from the upper shelf section and the two sections connected during erection by a flange or other suitable means. Other methods of sectionalizing the equipment for convenience of erection may also be used.

In the arrangement an internal or external cooler, as shown at 1a in Fig. 1, may be placed so as to cool the air entering at 2 before it contacts with the lowest shelf 12. In that event a damper 2a placed in inlet duct 2 is closed and the air supplied to inlet 2 through cooler 1a. Cooling coils (not shown) may be immersed wholly or partially in the liquid on any of the shelves 12. Also, cooling coils may be placed in between any two of the shelves 12. Where the amount of humidity to be removed is low or where the apparatus is placed in a cold cellar, sufficient cooling of the air may be obtained in passing between any two pans and any two layers of cakes by the impingement of the air against the side and end walls of the box. This cooling effect can be increased by providing radiating fins at the proper points on the walls of the apparatus. If desired, the entire box 1 may be provided with a water jacket and then operated either with or without internal coils. In these various ways described the removal of heat may be accomplished by radiation, by convection, by conduction, or by any combination of these factors.

It is also within the spirit and scope of my invention to have the intermediate coolers between cakes, between cakes and shelves, between shelves or preceding the shelves, entirely outside of the box 1 and connected to it by suitable ducts.

If cooling is desired so as to get a very material reduction in the temperature of the air issuing from the apparatus, circulating water chilled by ice or other suitable means may be used in either the coils, a water jacket or both. If this expedient is employed, as a natural result, the absolute humidity of the effluent air will be still further reduced.

Referring now to Figs. 4 to 7 of the accompanying drawings, the form of apparatus here illustrated for carrying out the method of my invention comprises an air treating chamber 30 which is made in upper and lower sections 31 and 32, respectively. Both of these sections are made of sheet metal bound at the corners with suitable steel shapes to give stiffness. At the meeting edges of the two sections 31 and 32, they are provided with angle bars having apertures for the reception of bolts 33 by means of which the two sections are secured together. By making the chamber 30 in these sections, the liquid-holding trays 34 may be constructed as separate individual units and stacked within the lower section 32 one upon another prior to the placing of upper section 31. The two halves of the apparatus are light in weight and small enough to be transported through doorways even for apparatus of large capacity.

Unlike the apparatus of Figs. 1 to 3, the circulation of the air over trays 34 is from side to side instead of from end to end. Each of the trays 34 therefore is constructed so as to permit the passage of air past one side thereof.

Figure 4:
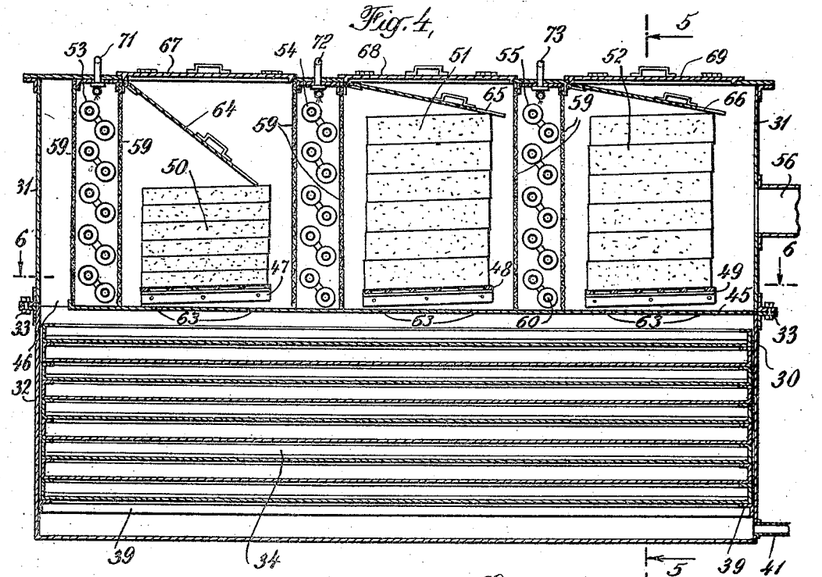
Fig. 4 is a longitudinal vertical section showing a modified form of apparatus.
Figure 5:
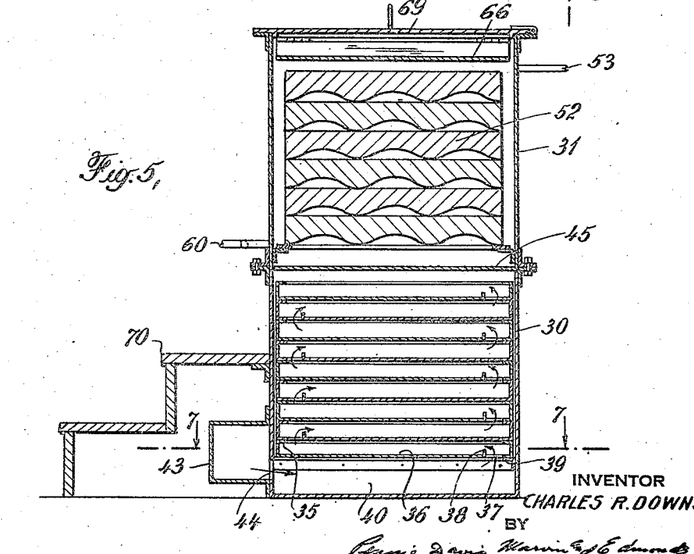
Fig. 5 is a transverse vertical section taken on line 5—5 of Fig. 4.
Figure 7:
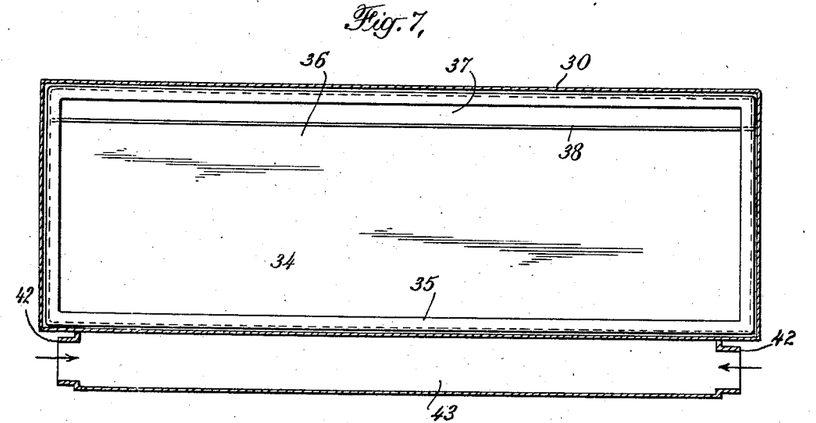
Fig. 7 is a horizontal section taken on line 7—7 of Fig. 5.

The construction of these trays is shown in Figs. 7, 5, and 4 wherein may be seen that they each comprise a framework 35 of channel section which extends around the entire periphery of the tray and loosely fits within the interior of section 30 of the air treating chamber. A metal plate or sheet 36 is welded or otherwise secured to the lower webs of the channel frame 35 and extends in width somewhat less than the width of the frame so as to leave an air slot or passageway 37 between the edge of the bottom plate and the channel frame on that side. The edge of the plate 36 along slot 37 is turned up to form a lip 38 which corresponds to the lips 13 of Figs. 1 to 3.

The lowermost tray rests upon angle bars 39 which are secured in any suitable manner to the interior walls of section 30 at a distance above the bottom of the section sufficient to provide a space 40 to receive the incoming air and to collect the liquid moisture-absorbing material as it leaves the lowermost tray. A pipe 41 is connected at a suitable point close to the bottom of section 30 to maintain a pool of liquid within space 40 and to carry away the surplus liquid to a sewer connection.

The air to be treated is let in through a duct attached to a collar 42 at either end of an air distributing box 43 which extends along one side of section 30 and has a discharge opening 44 through which air may enter the space 40.

It will be understood that in placing the trays 34 in position in section 30, they are laid so that their air slots 37 are arranged alternately on one side and then the other, so as to cause the air which ascends from space 40 to take a zig-zag path laterally of the apparatus in the direction of the arrows of Fig. 5. When the air reaches the uppermost tray, however, its direction of flow is changed from a cross-wise flow to a lengthwise flow, and to do this the upper section 31 is provided with a bottom plate 45 which completely covers the bottom of section 31 aside from the air passageway 46 at the left-hand end thereof. The air is forced by this plate to flow towards that end of the apparatus and is discharged into the upper section 31 through this passageway.

In the upper section 31 there are provided three supports for three stacks 50, 51, and 52 of calcium chloride cakes. There are also provided three cooling coil sections 53, 54, and 55. The air entering section 31 through passageway 46 passes alternately through a cooling coil section and through a calcium chloride cake stack and leaves the apparatus through the outlet duct 56.

Figure 6:
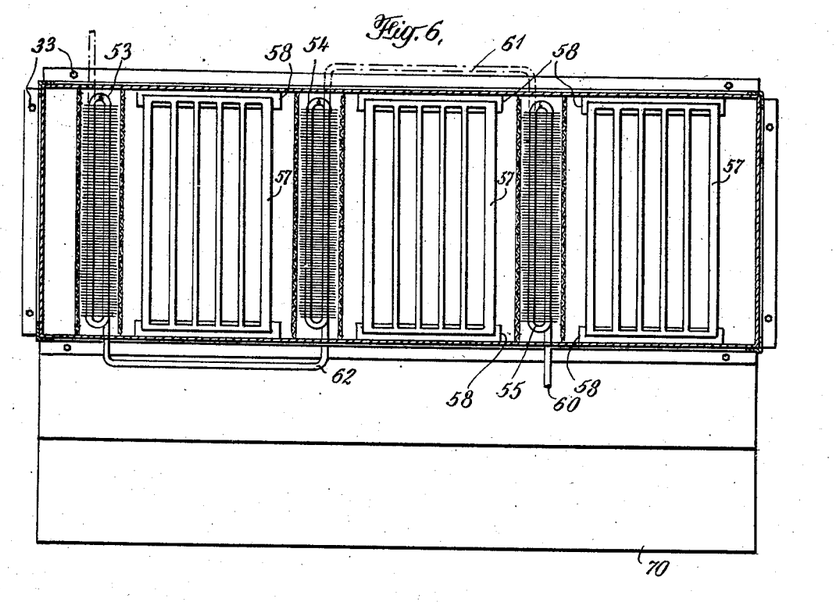
Fig. 6 is a horizontal section taken on line 6—6 of Fig. 4.

The supports 47, 48, and 49 for the calcium chloride cakes preferably consist of removable grids 57, as shown in Figs. 6 and 5, which rest upon angle bars 58 that are riveted or welded to the side walls of section 31. These supporting devices may be arranged at a sufficient angle to the horizontal so as to provide adequate drainage of liquid material from the stacks 50, 51, and 52, but as in the case of the apparatus of Figs. 1 to 3, this angle is not sufficiently steep to cause the cakes to slide one upon another.

The upper section 31, whose outlet duct 56 is shown in Fig. 4 at the right-hand side, may be reversed end for end on the lower section 32, thereby permitting the assembly of the apparatus so that the outlet duct 56 and the air inlet duct connected to the air entrance collar 42 may be at the same or opposite ends of the apparatus 30. The assembly depends upon the location in which the apparatus is to be placed.

The cooling coils 53, 54, and 55 may conveniently be made of finned tubing and are provided on each side with screens 59 for protecting the finned tubing from mechanical injury by contact of the calcium chloride cakes therewith during the charging of the apparatus. As before, although these coils may be connected in parallel they are preferably connected in series to conserve cooling water and then the cold water enters coil 55 at 60 and then passes through connection 61 to coil 54 and then through connection 62 to coil 53, after which it passes to waste or is otherwise disposed of. Coils or other cooling means may also be placed at either or both sides of the stacks of cakes at right angles to the coils 53, 54, and 55 shown in Fig. 4.

The bottom plate 45 of section 31 forms a collector plate for receiving the concentrated calcium chloride solution which drips from the stacks of cakes 50, 51, and 52 and this plate is provided with small perforations 63 to drain the solution onto the uppermost tray 34 and it then descends from tray to tray.

As in the apparatus previously described, the cakes of calcium chloride are preferably formed with undulating bottom surfaces so as to provide air channels through the several stacks 50, 51, and 52. In order to prevent the by-passing of the air over the tops of the stacks 50, 51, and 52 as the stacks are consumed, floating baffle plates 64, 65, and 66 are provided. These baffle plates are hinged as shown in Fig. 4 to the upper part of each stack compartment. The baffles rest upon the top of the stacks and as the cakes shrink, as shown, for example, in the left-hand stack of Fig. 4, the baffle plates descend and prevent the passage of the air over the tops of the stacks. The hinge may be extended through the wall of the box to a pointer and quadrant to indicate when the cakes have shrunk to a point where new ones must be charged.

In this form of apparatus the calcium chloride cakes are charged into the top of section 31, removable covers 67, 68, and 69 being provided for this purpose. Moreover, to facilitate the placing of the cakes within the several compartments steps 70 may be placed at one side of the apparatus as shown in Fig. 5. This type of apparatus provides larger cake capacity more conveniently than the apparatus of Figs. 1 and 2 and therefore requires less frequent charging.

When the apparatus shown in Figs. 4 to 7, inclusive, is used for humidifying, as for example in the winter time, the cakes of calcium chloride are removed therefrom, and steam or hot water is circulated through the coils 53, 54, and 55 while water is caused to drip upon the outside surfaces of these coils through nozzles 71, 72, and 73. An excess of water is discharged through these nozzles so as to prevent the formation of scaly deposits upon the surfaces of these coils. This excess of water also fills the trays 34. The air circulating over the trays and over the moistened heated coils 53, 54 and 55 gathers moisture therefrom and passes out of the discharge conduit 56 at the desired humidity.

It will be understood that with both forms of apparatus, automatic control of the air condition in the housed space may be provided by employing available control accessories such as humidostats and thermostats to actuate various parts of the apparatus.

Figure 8:
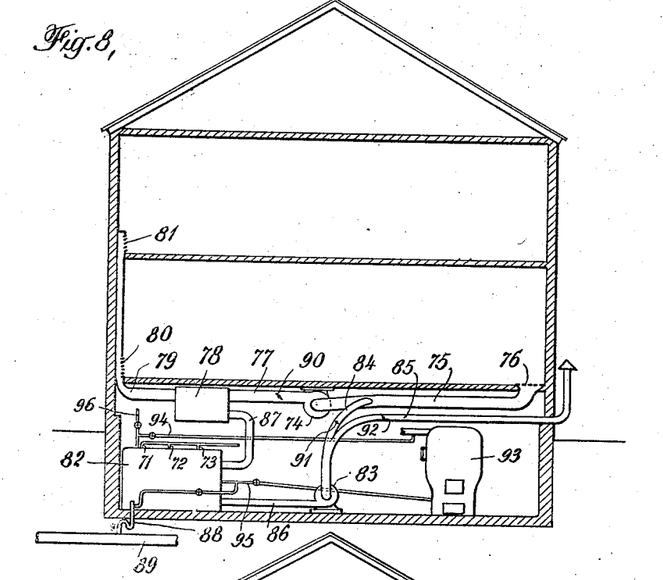
Figs. 8 and 9 are sectional views of a dwelling house to show the circulating duct systems for two slightly different installations of the air conditioning apparatus of the invention.

In Fig. 8 of the accompanying drawings there is shown an installation of my improved air-conditioning apparatus in a dwelling house which is equipped with heating by means of steam or hot water. In the cellar of the house there is provided a circulating fan 74, the inlet of which is connected to a duct 75 leading from a register 76 by which air is withdrawn from the first floor of the house and passed through a duct 77 to an air-cooling apparatus 78 and then discharged through duct system 79 and registers 80 and 81 into the various rooms of the house.

A humidifying and dehumidifying apparatus, preferably of the type shown in Figs. 4 to 7, inclusive, is indicated diagrammatically at 82. A second motor-driven fan or blower is shown at 83, the intake of which is connected to duct 75 by means of duct 84, and also the exterior of the house by means of duct 85. Fan 83 delivers its air through duct 86 to the air-conditioning apparatus 82, the discharge of which is connected by duct 87 to the air cooling apparatus 78, and thence to the duct system 79. The discharge from the air conditioning apparatus 82 is connected by means of a trap 88 to a sewer pipe 89. Dampers 90, 91, and 92 are placed respectively in ducts 77, 84, and 85 for the control of the air circulation.

The air-cooling apparatus 78 may employ as a cooling agent, water, ice water, brine, or a vaporizable refrigerant obtained from a refrigerating apparatus (not shown). The dry bulb temperature of the air discharged from cooler 78 may be adjusted by regulating the cooling effect therein.

There are certain warm days in the summer when the relative humidity of the atmosphere is not high enough to make it necessary to dehumidify by means of apparatus 82. On such days the dampers 91 and 92 may be closed, damper 90 opened, and fan 74 operated merely to produce a circulation of air through the house. If the atmosphere is sufficiently dry but too warm for comfort, the cooling device 78 may be placed in operation so as to cool the air as it passes therethrough. Inasmuch, however, as the cooling of air to any point above its dew point raises its relative humidity, if the atmosphere contains much moisture, the operation of the cooling apparatus 78 will not make the air much if any more comfortable.

On such days, during warm weather as the relative humidity of the atmosphere increases to such an extent as to interfere with comfort, but the temperature is not excessively high, fan 83 will be started so as to force air through the dehumidifying apparatus 82. Fan 74 may be maintained in operation or shut down (with damper 90 closed) and the air which is supplied to the dehumidifying apparatus may be taken either from indoors or from the outside, as desired, by adjusting dampers 91 and 92. If fan 74 is maintained in operation, damper 92 closed and damper 91 opened, the air passing through the cooler 78 is a mixture of comparatively dry air from the house and still drier air from the dehumidifying apparatus 82. As the cooler 78 operates therefore upon relatively dry air, it is not cooled to a temperature below its dew point, and as no latent heat of condensation has to be removed by cooler 78, the cost of cooling the air is decreased.

It should be noted that my system of dehumidification has a very definite advantage in that if a low humidity air is passed through the dehumidifier, no work is done and no calcium chloride used up. The solid hydrous calcium chloride preferred for use is in equilibrium with air of around 20% relative humidity and if air of that or lower humidity is passed through, no action takes place. Therefore, on low humidity days, if fan 83 continues to operate, no added expense is entailed except the power to run the fan. Whenever the humidity in the air rises to above the equilibrium of about 20% relative humidity, the solid hydrous calcium chloride starts to function automatically. In this it is quite different from refrigeration by ice since when such a cooler is not in use, any ice remaining therein continues to melt and when refrigeration is again required, a new supply must be secured. These considerations might indicate the use of a single fan always in series with the dehumidifier. However, it is more practical to have the two fans 74 and 83 in a house installation as when humidifying in winter only the lower air flow of the humidifier fan is desired, and in the summer, at such times as dehumidification is unnecessary, there is a saving of power by avoiding the resistance interposed by the dehumidification chamber.

It will be understood that in utilizing my improved dehumidifying apparatus 82, the arrangement of air ducts may be modified as desired from that shown in Fig. 8. Thus, air from the dehumidifying apparatus 82 may be discharged directly into the duct system 79 instead of being delivered into the cooler 78. Also, the air from the dehumidifying apparatus may be distributed through the house by an entirely separate duct system. Further, if desired, only the air coming from the dehumidifier apparatus may be passed through cooler 78, and the air circulated by fan 74 not passed through cooler 78.

A sufficient treatment of the air to render it comfortable, will in probably the majority of cases be obtained through the installation and operation of the dehumidifying apparatus and the fan 74, without the inclusion of cooler 78. This reduces the cost of both installation and operation, and among other things simplifies the placing of the air discharge registers 80 and 81. Where dehumidification alone is utilized for treating the air in the summer time, these registers may be arranged to discharge the dry air at the floor levels. However, when the cooler 78 is installed for chilling the air, the discharge registers should be located at or near the ceilings of the rooms to prevent the formation of a cold stratum of air along the floors.

Although as stated above, a part or all the air passing through the dehumidifying apparatus 82 may be taken from duct 75, I prefer under ordinary conditions to take all of this air through duct 85 from the outside of the house. By doing this, only high humidity air is passed through the dehumidifying apparatus, and in this way the volume of air to be passed therethrough in order to maintain the humidity of the building at the desired level, is reduced. Moreover, fresh outside air is continuously brought into the building, instead of depending upon the entrance of fresh air by leakage through the walls and around the windows and doors.

It will, however, be of advantage in a well insulated building to take all of the air to be dehumidified in through duct 85 at night when the outside temperature is reduced and thereby cool the house with dry air below the daytime temperature. As the outside temperature increases the next morning, it is advantageous to adjust dampers 91 and 92 so that the air to fan 83 is drawn from the building through register 76 thereby reducing the ingress of air warmer than that existing in the building.

When the apparatus of Fig. 8 is to be used for humidifying the air in the winter time, the operation of air cooler 78 is, of course, discontinued. Damper 90 is closed and fan 74 is not used. Damper 92 is also closed, and damper 91 opened so that by operating fan 83 air is drawn from the lower floor through the register 76, passed through the apparatus 82 and discharged through duct 87 to the duct system 79 and registers 80 and 81. Steam or hot water from the house heater 93 is delivered through pipe 94 to the coils of apparatus 82, and returned to the heater 93 through line 95, the supply of cold water to these coils from pipe 96, which is required during dehumidification, being cut off. Hot or cold water is also fed to the nozzles 71, 72, and 73 of the apparatus 82.

An automatic humidity regulator may be placed in any suitable location in the house and so connected as to automatically control the operation of fan 83, the valve in pipe 94 and the water supply to the apparatus 82.

Figure 9:
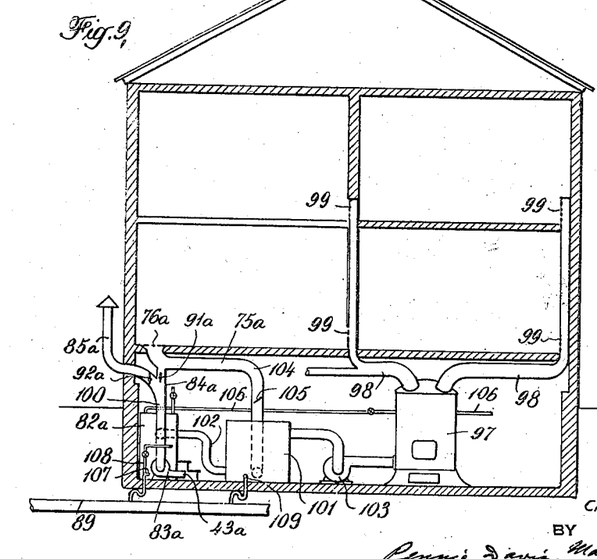

In the illustration shown in Fig. 9 the house is heated by means of a warm air generator or furnace which delivers air through the ducts 98 to the various rooms of the house through registers 99. The air-conditioning apparatus is shown at 82a. A fan 83a receives air from duct 100 and discharges it into the air distributing box 43a of the air-conditioning apparatus. Duct 100 may receive air from the outside of the building by means of a branch 85a which is provided with a damper 92a. Duct 100 may also receive air from a branch 84a having a damper 91a. Branch 84a connects with a duct 75a which is connected with an intake register 76a. Thus, as in the installation of Fig. 8, the air-conditioning apparatus 82a may take air either from the interior of the house or from the outside.

In this installation, instead of the air cooler 78, a cooler 101 is shown wherein the air is cooled by water ice. The ice is placed in a chamber within the apparatus 101 and the air is circulated around this chamber, the ice and the ice water therefrom being kept out of direct contact with the dry air but in heat-transferring relation thereto. The air inlet to cooler 101 from the air-conditioning apparatus 82 is the duct 102. The air therefore, after passing through apparatus 82, is drawn through the air cooler 101 by means of fan 103 and forced into the casing of the heating apparatus 97 which serves to distribute the air among the several ducts 98. When it is desired to circulate air through the house without conditioning it, duct 104 is used to carry the air direct from register 76a to cooler 101. Damper 105 regulates the flow of air through this duct.

The general operation of the installation shown in Fig. 9 is similar to the installation shown in Fig. 8. The water for supplying apparatus 82a when it is used as a humidifier is fed through pipe 106 which passes through a heating coil preferably arranged within the furnace 97. The water thus heated is conveyed to perforated pipe 28 (Figs. 1 and 2) of the apparatus 82a or to the nozzles 71, 72, and 73 (Fig. 4).

Hot air from the furnace may be passed directly through the apparatus 82a for more efficient evaporation of water in the trays. This can be accomplished by a suitable arrangement of ducts (not shown).

The liquefied and diluted calcium chloride solution which is formed during dehumidification, and the excess of water within the apparatus during humidification are drained to a sewer pipe 89 by a connection which leaves the apparatus 82a at 107. The drains from the coils 53, 54, and 55 also drain into the sewer at this point through pipe 108. A connection 109 is also provided for the drainage of ice water from the cooler 101.

Figure 10:
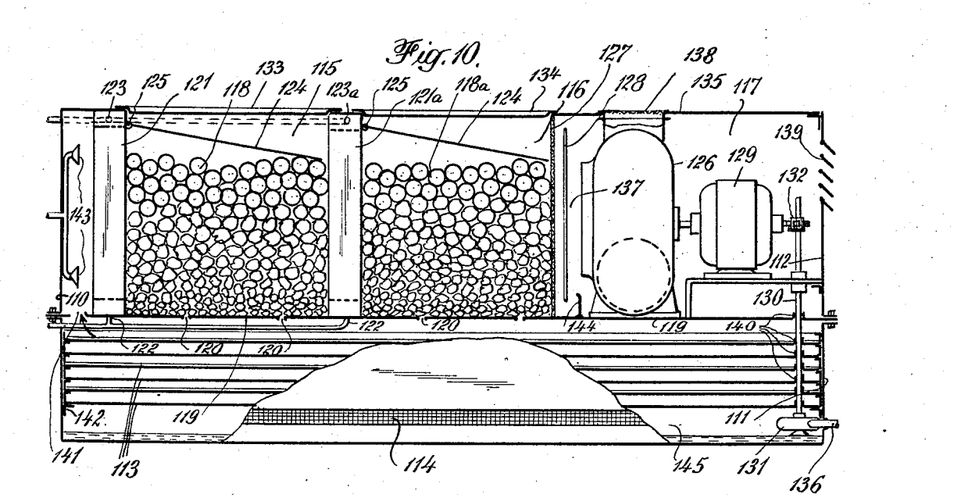
Fig. 10 represents a vertical longitudinal section of a self-contained unit air conditioner to be used for conditioning the air in a room or other space.

In Fig. 10, I show an adaptation of my invention, partly in longitudinal section and partly in front elevation, so arranged as to be constructed and contained in a single cabinet to be used as a unit air conditioner. This figure also shows the use of solid deliquescent material in the form of lumps, briquets or spheroidal shapes.

Cakes of calcium chloride as illustrated in Figs. 1-7 of the drawings, although successful in operation, have certain disadvantages in some forms of apparatus in that during liquefaction they contract on the sides and ends, especially on the leading edges. After the apparatus has operated for some time the plane area of the cakes diminishes and the air tends to by-pass around the cakes and they also assume a wedge shape, making a stack of cakes tilt toward the leading edges at a considerable angle. The tilting toward the leading edges can be corrected to a considerable extent by casting the cakes in wedge shape and when new cakes are charged the thicker ends may be inserted as leading edges. For this purpose the cakes may be cast from the end and the wedge shape of the mold assists in removing the cakes therefrom.

Furthermore, the porosity of the cake due to shrinkage while cooling is largely concentrated in the leading edge which is less objectionable there than throughout the center of the cake. The spaces formed at the sides and ends of the cakes by shrinkage do not fill up as the stack shrinks in height. These side spaces can be eliminated by substituting for the cakes cylinders or truncated cones whose axes are substantially horizontal and parallel to the air flow. During operation these forms upon contraction tend to roll over, thereby preventing the formation of open side spaces and keeping the compartment filled transverse to the air flow. Calcium chloride forms of this general shape are not completely ideal, as they, like the cakes, shrink lengthwise leaving empty spaces at the ends.

I have found from an extensive series of investigations that lumps, briquets and forms generally spheroidal in shape obviate these disadvantages. If such shapes are charged to the chambers and moist air is passed through the voids of the mass the individual lumps upon absorption of moisture liquefy in proportion to the amount of moisture absorbed and individually shrink in volume to what I call ultimate kernels, which are comparable in size to granules, and then disappear altogether. The mass is therefore constantly undergoing a change, as may be seen from Fig. 10 from a collection of, for example, spheroidal shapes of larger size to irregular shapes of smaller size. The mass thereby automatically sinks both sideways and endways in the chamber, keeping it filled up to the vertical wall surfaces.

If small lumps are charged to the chamber, the ultimate kernel size is reached when the collective bulk of the mass is still large, thereby reducing the void dimensions which increases the resistance to air penetration and decreases the rate at which the viscous solution will drain through the mass. Then when fresh spheroids are charged into the chambers above the kernels, the air tends to pass through the more open fresh mass above the same, thereby ultimately interfering with proper operation. Per contra the larger the original lumps the smaller will be the bulk of their collective mass as these are reduced to the ultimate kernels and hence the collective volume of the ultimate kernels does not accumulate at a greater rate than can be continuously liquefied.

It is to be noted that all of the lumps do not contract in size and shape in the same way in all parts of the chambers, and the varying sizes and shapes tend to bridge across to a certain extent, thereby assisting in keeping the mass open during shrinkage. This variation in size and shape of the lumps is undoubtedly due to the course of impingement of the moisture laden air upon the lumps as it passes through the open tortuous channels of the mass. Because of this the lumps, during their liquefaction, generally become pitted with varying sized cavities which tend to increase the exposed surface area in proportion to their weight or volume. This effect assists in maintaining a sufficiently large exposed area for drying the air while the total mass is shrinking in volume.

It will be understood that massive deliquescent calcium chloride in the form of lumps, briquets and the like, as just described, can advantageously be used in the apparatus of Figs. 1–7; also that massive deliquescent calcium chloride in the form of slabs, blocks and the like may, if desired, be used in the apparatus of Fig. 10.

I do not intend to limit myself to any one form of solid calcium chloride since the various types have inherent advantages. The important essential is that the mass shall maintain, throughout its operation, channels open to the free flow of air and liquid.

For convenience of description, the cabinet 110 of Fig. 10 is divided into a lower portion 111 and an upper portion 112.

The lower portion 111 contains a series of liquid-holding trays 113 arranged and constructed in a manner similar to the trays 34 shown in Figs. 4, 5, and 7. Trays 113 are supported on the supporting angle 142 which extends around the perimeter of cabinet 110 and is secured to its walls. An air inlet 114 consisting of a long slot, preferably covered by a grille, extends along the front of the cabinet below the bottom of the lowest tray, but sufficiently above the bottom of the cabinet to form a temporary reservoir 145 for collecting liquid. The outlet of air from the bottom portion 111 to upper portion 112 is at transverse slot 141.

The upper portion 112 separated from the lower portion 111 by supporting pan 119 is divided into three compartments 115, 116 and 117. Compartments 115 and 116 contain calcium chloride masses 118 and 118a. These are shown as spheroidal lumps of varying size, the apparatus having been operated over a period of time and recharged repeatedly. Radiator sections 121 and 121a are placed before compartments 115 and 116. These radiator sections are connected to water supply for cooling through the inlets 122 and 122a, such water discharging from outlets 123 and 123a. The water flow through the radiators may be either in parallel or series.

Above the masses of calcium chloride are floating baffles 124, hinged at 125, with the floating ends resting on the masses so as to follow the masses as the latter shrink during liquefaction and continuously direct the air through the channels of the masses. Supporting pan 119 contains apertures 120 in compartments 115 and 116 to drain, to topmost tray 113, the liquid formed during the liquefaction of the masses. Lids 133 and 134 give access to compartments 115 and 116 for charging calcium chloride.

Compartment 117 separated from compartment 116 by screen 127 and baffle 128 contains fan 126 and motor 129. The fan inlet is indicated at 137, the outlet is through grille 138. An adjustable louvre or damper 139 is shown communicating with fan compartment 117. A transverse lip 144 sealed at bottom and ends to supporting pan 119 serves to prevent liquid drainage into compartment 117. Lid 135 serves to give access to compartment 117.

In case the liquid formed cannot be conveniently discharged to the sewer from the temporary reservoir 145 by gravity, the sump pump 131 is connected by shaft 130 and worm gear 132 to motor 129. The sump pump can discharge the liquid to a higher level through outlet 136. Lips 140, surrounding apertures and sealed to trays 113 allow the passage of shaft 130 to pump 131 without leakage of liquid downwardly.

For use as a humidifier, the apparatus is provided with water sprays 143 directed toward radiator 121. When the apparatus is used as a humidifier 123 serves as a steam inlet and 122 as a drain for condensed steam.

When the apparatus is used as a dehumidifier, moist air is drawn into the cabinet 110 through inlet 114, passes consecutively over the calcium chloride solution in the trays 113 in a manner similar to the process described for Figs. 4 and 5, thence through the transverse slot 141 in the direction of the arrow and then consecutively into contact with cooler 121, calcium chloride 118, cooler 121a, and calcium chloride 118a, and is discharged by the fan 126 through opening 138. Simultaneously room air is drawn around the casing of the fan through damper 139 to fan inlet 137 and discharged by fan through opening 138. This damper can be adjusted so that any ratio of untreated room air to treated air can be obtained. This means that the one fan can serve to circulate a large volume of air in the room to enhance comfort by increasing air velocity and at the same time dehumidify such proportion of the air as may be necessary. The flow of untreated air from damper 139 through compartment 117 also serves to cool the motor and compartment.

I have found during use as a dehumidifier that as soon as the flow of air is started through my apparatus, the action starts and moisture is removed from the treated air with no time lag. Moreover, when the apparatus is not in use and air is not flowing therethrough the calcium chloride is not being used and does not depreciate in quantity or quality.

I have shown in this embodiment of my invention calcium chloride masses consisting of spheroids. As I have stated previously other shapes and forms may be used in this apparatus. The larger spheroids at the top of masses 118 and 118a represent freshly charged material.

When the apparatus of Fig. 10 is used as a humidifier, water is sprayed by nozzles 143 against heated coil 121, the water used being in excess of that required. The excess drains to drays 113 and is finally run to the sewer or removed by pump 131. The dry air enters at the grille 114, flows countercurrent to the water flow in trays 113, thence passes the radiator and is discharged back to the room as humidified air. When the apparatus is used as a humidifier, the calcium chloride is, of course, removed therefrom and the damper 139 is preferably kept closed.

This unit type of apparatus is especially useful for spaces where it is inconvenient to use ducts, as in apartments, restaurants, offices and the like.

Where a conditioner of this type is working to maintain low humidity and there is relatively small moisture leakage into the space other than that given off by the occupants, the heat formation from absorption of moisture may be low enough to be dissipated by air convection and radiation from the cabinet walls. In such case the cabinet would be entirely portable and capable of being merely plugged into an electric socket where it was to be used. A portable drain pan would be provided to take the effluent solution of calcium chloride instead of providing a sewer connection. In industrial or other applications where a low humidity is the only object, the humidifying features of the various types of apparatus shown in the figures may be omitted.

Other variations of the apparatus can be provided to meet the limitations of a specific set of conditions. Control can be manual or automatic in all forms of the equipment. The specific examples described are merely illustrations and I do not intend them to limit the scope of my invention.

The method of my invention, as previously described, involves the passage of the air to be treated in contact with a deliquescent moisture-absorbing agent, such, for example, as calcium chloride in solution and in massive solid form in sequence. When air is passed over such material the latent heat of condensation of the moisture causes the temperature of both air and absorbent material to rise as previously mentioned. The temperature of the solid absorbent material at any given point, however, rises to a higher point than the temperature of the air, for the heat is liberated at the surface of the absorbent material and the rate of heat removal by the air current is initially less than the rate at which heat is liberated. The temperature reached ultimately by the solid absorbent is that which establishes a temperature differential between the solid absorbent and the air sufficient to transmit through the air all the heat that is being continually formed by moisture absorption. This equilibrium temperature of the solid absorbent conditions the absolute moisture content of the air leaving the solid surface. By my method of cooling, this equilibrium temperature is lowered in a novel and ingenious manner and consequently the equilibrium of air and moisture altered so as to produce a less humid effluent air.

When I use the term calcium chloride in the claims, I intend to include either anhydrous calcium chloride or other solid varieties of calcium chloride containing water of crystallization.

My method and apparatus does not require the use of moving mechanical parts, except the fan for conveying the air through the apparatus, and thus eliminates to a large extent power costs as well as the servicing and repairs ordinarily associated with such equipment.

I claim:

1. The method of dehumidifying air by the deliquescence of a solid deliquescent material which comprises passing the air through a series of drying zones including a liquid phase drying zone and a plurality of solid phase drying zones, removing heat from the air during its passage through said series of drying zones, draining the solutions from said respective solid phase drying zones independently of one another, and transferring the same to said liquid phase drying zone.

2. The method of dehumidifying air by the deliquescence of calcium chloride which comprises passing the air through a series of drying zones including a liquid phase drying zone and a plurality of solid phase drying zones, cooling the air during its passage through said series of drying zones, draining the solutions from said respective solid phase drying zones independently, transferring the same to said liquid phase drying zone, and controlling the cooling of said air to maintain the average temperature in each of said drying zones progressively lower throughout said series of drying zones.

3. The method of removing moisture and dust from gases which comprises passing the gases in contact with liquid calcium chloride, and through beds of solid calcium chloride, cooling said gases between said beds of solid calcium chloride and draining the moisture and dust collected on the particles of solid calcium chloride independently from each of said beds into the supply of liquid calcium chloride.

4. The method of dehumidifying a gas which comprises providing beds of massive solid calcium chloride, passing the gas through said beds, cooling the gas between said beds and draining the liquefied calcium chloride therefrom into contact with the incoming gas while preventing the liquefied calcium chloride from one bed from contacting with any other bed.

5. The method of dehumidifying air which comprises providing a series of beds of massive solid calcium chloride, passing the air to be dehumidified successively through said beds, cooling said air between said beds to cool said solid calcium chloride to remove latent heat of condensation of the moisture in said air generated in the solid calcium chloride, and draining the liquefied calcium chloride from each bed independently of the other beds.

6. The method of dehumidifying air which comprises subjecting the air to a partial drying operation by contact with a solution of calcium chloride, subjecting the partially dried air to a second drying operation by contact with masses of solid calcium chloride, alternately cooling said air and contacting the same with masses of calcium chloride until the desired degree of drying of the air has taken place, and preventing the solution dripping from any one of said masses from contacting with any other of said masses.

7. The method of dehumidifying air which comprises subjecting the air to a partial drying by contact with a series of pools of calcium chloride solution, the contact of the air and said solutions being countercurrent to the flow of the solution so that as the air contacts with solutions of increasing strength the absolute moisture content of the air decreases, then cooling the partly dried air and subjecting it to further drying action by contact with massive solid calcium chloride, and delivering the solution formed by said solid calcium chloride to said pools without substantial reduction in temperature and without contact with other solid calcium chloride.

8. An apparatus for dehumidifying air by the deliquescence of calcium chloride or the like comprising means for supporting a plurality of separate masses of solid calcium chloride, a plurality of trays for supporting a plurality of pools of liquid calcium chloride arranged in series, means for directing the air to be dried over the surfaces of said pools and then into successive contact with said separate masses, heat exchangers positioned in the air stream adjacent said masses for removing heat, and means for draining the solution independently from said masses and independently transferring the same to said trays without contact with said heat exchangers.

9. An apparatus for dehumidifying air by the deliquescence of calcium chloride or the like comprising means for supporting a plurality of separate masses of solid calcium chloride, a plurality of trays for supporting a plurality of pools of liquid calcium chloride arranged in series, means for directing the air to be dried over the surfaces of said pools and then into successive contact with said separate masses, means for removing heat from the air as it traverses said masses, and means for maintaining said heat removing means at progressively lower temperatures in the direction of air flow.

10. In an apparatus of the character described, the combination of a chamber containing a series of vertically spaced superimposed horizontal trays, a pool of calcium chloride in water solution on each of said trays, compartments above said chamber containing massive solid calcium chloride, means for passing a current of air successively over the trays in said chamber and through said compartments, heat removing means in said air current between said compartments, and means for conveying calcium chloride solution from said compartments to the top tray of said chamber without allowing the solution to come into substantial contact with a cooler medium.

11. In an apparatus of the character described, the combination of a chamber containing a plurality of vertically spaced horizontal trays, means for retaining a pool of calcium chloride in water solution on each of said trays, a plurality of compartments above said chamber each containing massive solid calcium chloride, means for discharging calcium chloride solution from each of said compartments independently and directly onto the uppermost tray, means for directing the passage of a current of air successively over the trays in said chamber and then successively through said compartments, and a cooler for removing heat preceding and associated with said compartments.

12. In an apparatus of the character described, a chamber, a charge of deliquescent material therein, means for passing a current of air horizontally through said material and a hinged member resting at its free edge on said charge and obstructing the current of air above said charge.

13. In an apparatus of the character described, the combination of a chamber containing a plurality of vertically spaced horizontal trays, means for retaining a pool of liquid moisture-absorbent solution on each of said trays, a compartment above said chamber containing massive solid deliquescent material, means for conveying liquefied deliquescent material from said compartment to said trays, means for directing the passage of a current of air successively over the trays in said chamber and then through said compartment, a cooler for removing heat preceding and associated with said compartment, and a baffle member in said compartment supported upon the upper surface of the solid deliquescent material therein so as to descend as said material shrinks in volume and thus prevent the bypassing of the air over the top of said material.

CHARLES R. DOWNS.